June 7, 1960

B. H. KEATING ET AL 2,939,741

SUNSHADE SUPPORT ASSEMBLY

Filed Oct. 25, 1956

INVENTORS
Bernard H. Keating &
BY Claude P. Sprink
W. S. Pettigrew
ATTORNEY

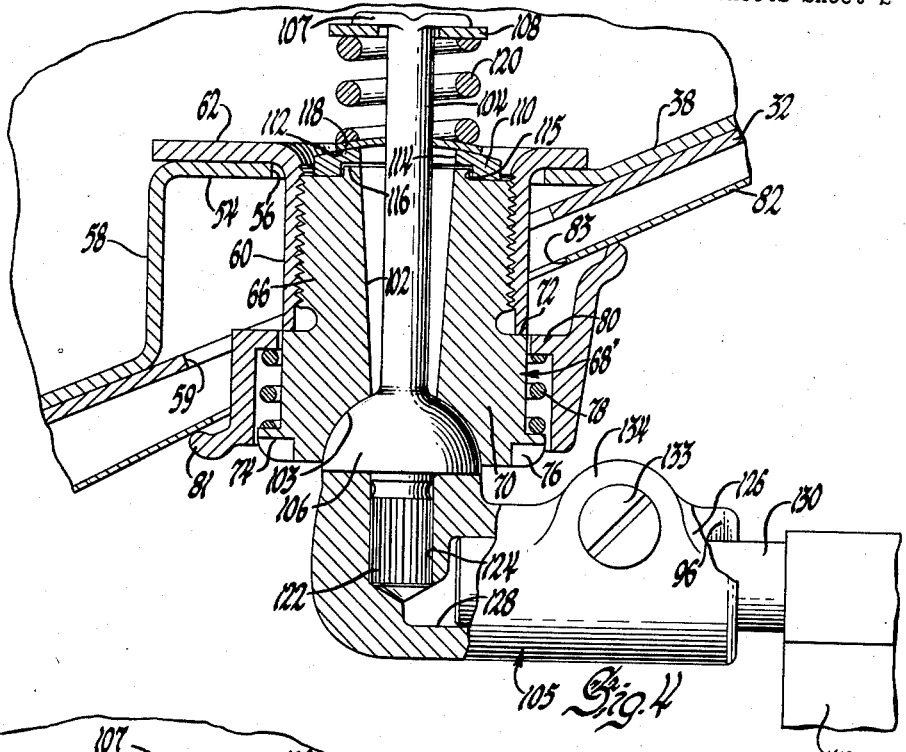
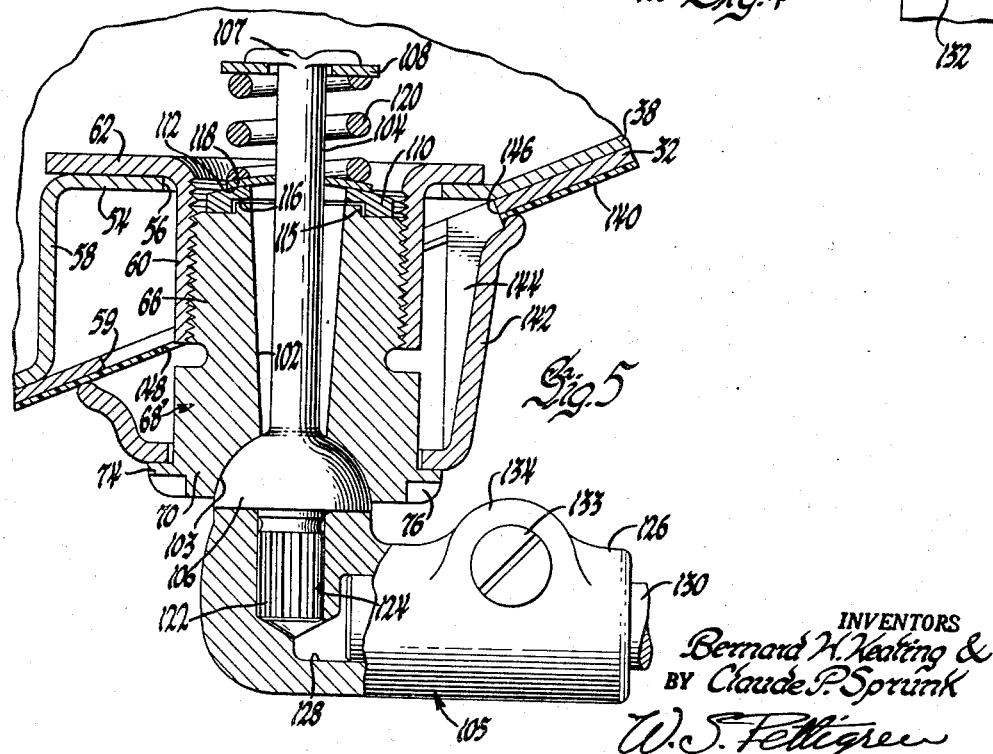

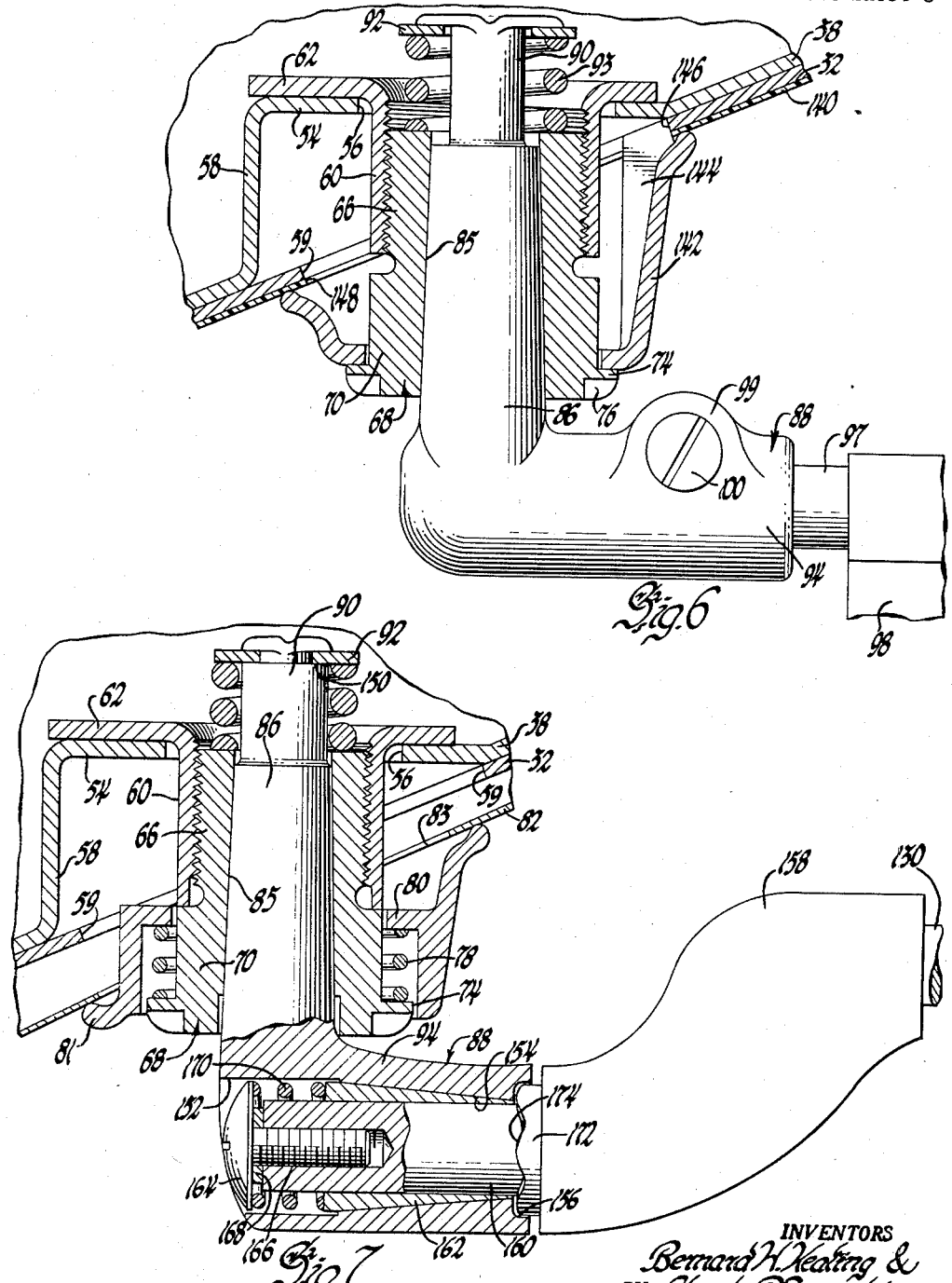

United States Patent Office 2,939,741
Patented June 7, 1960

2,939,741

SUNSHADE SUPPORT ASSEMBLY

Bernard H. Keating, Detroit, and Claude P. Sprunk, Pontiac, Mich., assignors to General Motors Corporation, Detroit, Mich., a corporation of Delaware Filed Oct. 25, 1956, Serial No. 618,323

6 Claims. (Cl. 296—97)

This invention relates to sunshade support assemblies and more particularly to sunshade support assemblies for vehicle bodies which provide improved means for mounting the assemblies on vehicle bodies.

Many current production assemblies are provided with mounting flanges which are secured to the windshield header by screws or the like in order to mount the assemblies on the body, with both the flanges and the screws or the like being visible. Also, in many instances the body headlining is located in spaced relationship with the header so that it becomes locally depressed in the area of the assemblies when clamped against the header by the mounting flange. This often requires that the headlining be flexible enough to withstand the local depressions without breaking or cracking and presents the use of semi-rigid or rigid headlining unless the headlining fits flush with the header in the areas of the assemblies.

The sunshade support assemblies of this invention provide improved means for mounting the assemblies on vehicle bodies such that the mounting means is completely concealed from view. In addition, the assemblies of this invention may be used with all types of body headlining, whether flexible, semi-rigid, or rigid, and irregardless of whether the headlining fits flush with the windshield header or is located in spaced relationship therewith in the areas of the assemblies.

The primary object of this invention is to provide improved means for mounting sunshade support assemblies on vehicle bodies. Another object of this invention is to provide improved means for mounting sunshade support assemblies on vehicle bodies such that the mounting means is completely concealed from view. A further object of this invention is to provide improved means for mounting sunshade support assemblies on vehicle bodies such that the assemblies may be used universally with all types of body headlining, whether flexible, semi-rigid, or rigid, and irregardless of the spatial relationship of the headlining with the supporting body member for the assemblies.

These and other objects of this invention will be readily apparent from the following specification and drawings, in which:

Figure 4 is a view similar to Figure 3 showing another embodiment of my invention;

Figure 5 is a view similar to Figure 3 showing a further embodiment of my invention;

Figure 6 is a view similar to Figure 3 and showing yet another embodiment of my invention; and Figure 7 is a view similar to Figure 3 showing an improved sunshade support arm.

Figure 1:
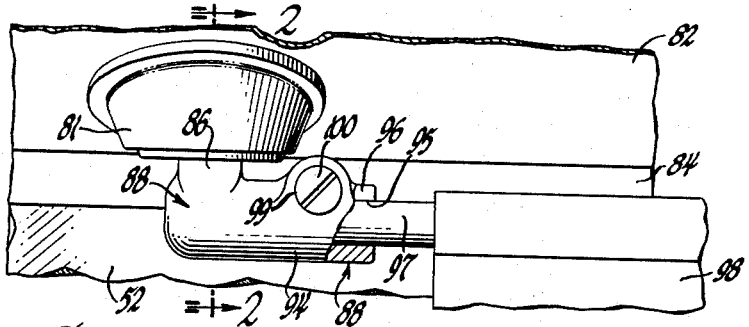
Figure 1 is a view of a sunshade supporting assembly according to one embodiment of this invention in assembled position on a vehicle body.
Figure 2:
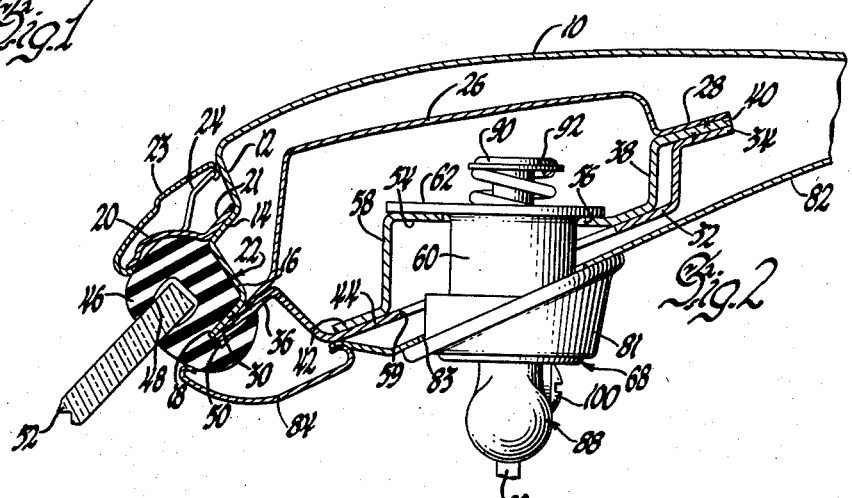
Figure 2 is a sectional view longitudinally of the body in the area adjacent the assembly of Figure 1 and taken on the plane indicated by line 2—2 of Figure 1.
Figure 3:
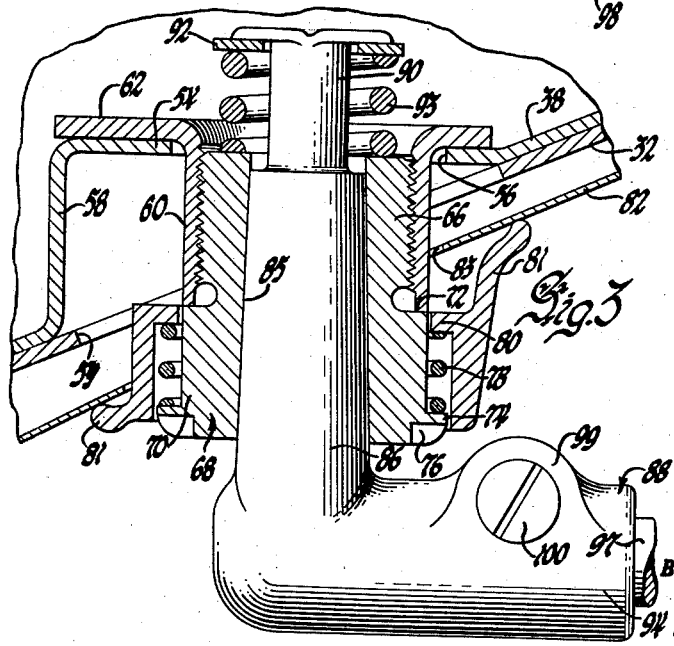
Figure 3 is an enlarged partial sectional view of the assembly of Figure 1.

Referring now particularly to Figures 1 through 3 of the drawings, one embodiment of this invention will be described.

A vehicle body includes a roof panel 10 provided with laterally extending flange portions 12, 14, and 16 adjacent its forward end and terminating in a forwardly and downwardly directed flange 18. A body member 20 includes a laterally extending flange 21 welded to flange portion 14 to mount member 20 on the body. Member 20 provides one side wall of a weather strip receiving channel 22, with the other side wall of the channel provided by flange portion 16 and flange 18. An outer body trim molding 23 is of generally C-shaped cross section longitudinally of the body. The rear edge portion of trim molding 23 is hooked over tabs 24 which are lanced out of member 20 and the forward edge portion of the trim molding is hooked over the forward edge of member 20 to mount the trim molding on the body. The trim molding extends between flange portion 12 and the forward edge of member 20 to conceal the member and provide a continuation of the contour of roof panel 10.

The windshield header includes an upper channel-shaped member 26 provided with flanges 28 and 30, a lower channel-shaped member 32 provided with flanges 34 and 36, and an inner channel-shaped reinforcing member 38 provided with flanges 40 and 42. Flanges 28, 34, and 40 are spot welded together to assemble the rear edge of the windshield header and flanges 18, 30, and 36 are spot welded together to assemble the forward edge of the roof rail header and to also provide what is commonly known as a pinch weld structure. Flange 42 is spot welded to the lower wall 44 of member 32.

A weather strip 46 is provided with oppositely opening channels 48 and 50. The weather strip is received within the weather strip receiving channel 22 with channel 48 receiving the upper edge portion of the vehicle windshield 52 and channel 50 receiving the pinch weld structure.

The inner reinforcing member 38 of the roof rail header includes an intermediate flange portion 54 which is located substantially parallel to the horizontal and provided with a circular aperture 56 and a forward substantially vertical flange portion 58. The lower member 32 of the roof rail header includes a circular aperture 59 which is somewhat larger than aperture 56. A sheet metal nut 60 fits within apertures 56 and 59 and includes a laterally extending annular flange 62 which is welded or otherwise secured to the intermediate flange portion 54 of member 38 in order to mount the nut on the body. It will be noted that the diameter of the nut is less than that of both apertures 56 and 59 in order that the nut may be positioned on the body with tolerance allowed for manufacturing conditions. The nut is integrally threaded and threadedly receives the externally threaded upper portion 66 of a socket member 68. The lower portion 70 of the socket member is of greater diameter than the upper portion in order to provide an annular shoulder 72 which is adapted to be engaged by the lower edge of nut 60 in order to provide a stop limiting the inward movement of the socket member with respect to the nut.

The lower portion 70 of the socket member includes a marginal annular flange 74 which is provided with a number of annularly spaced radial grooves 76 to provide for engagement of the socket member by a suitable tool in order that the socket member may be threaded into and out of nut 60. Flange 74 also provides a support for the lower end of a coil compression spring 78 which encircles the lower portion 70 of the socket member. The upper end of spring 78 engages an internal annular flange 80 of an annular escutcheon member 81 in order to resiliently mount the escutcheon member on the socket member.

As is well known, the roof panels of vehicle bodies are usually concealed by headlining 82 which may be rigid, semi-rigid, or flexible and which may fit flush with the lower member 32 of the header or which may be located in spaced relationship therewith as headlining 82. Nut 60 and socket member 68 extend through a suitable aperture 83 in the headlining so that spring 78 resiliently holds the escutcheon member 81 in engagement with the headlining around the aperture to conceal the aperture, nut 60, and the windshield header from view in the assembled position of the assembly. An inner garnish molding 84 extends across the upper edge portion of the windshield in order to conceal the mounting means for the forward edge portion of headlining 82 and to also conceal the portion of the roof rail header which is not concealed by the headlining.

The socket member 68 is provided with an upwardly tapering bore 85 which rotatably receives a complementary upwardly extending tapered portion 86 of the sunshade support arm 88. The upper end of portion 86 is provided with a circular bifurcated portion 90 of reduced diameter. Each of the legs of the bifurcated portion 90 is bent laterally in order to provide a stop for a washer 92. A coil compression spring 93 extends between the socket member 68 and washer 92 in order to bias the tapered portion 86 of arm 88 upwardly within bore 85 to provide a tight fit between these members in order that arm 88 may be rotated relative to the socket member and yet adequately be held in any adjusted position without movement.

The laterally extending portion 94 of arm 88 is provided with a bore 95 and a slot 96 which opens to the bore, with both the bore and slot extending substantially to portion 86 of the arm. Bore 95 receives one end of a rod 97 which supports the sunshade 98. A pair of like threaded bosses 99 on either side of slot 96 receives a bolt 100 which draws the bosses toward each other to clamp rod 97 within bore 95 and mount the sunshade on the support arm for movement therewith.

By providing the nut 60 and the socket member 68 with complementary threaded portions, the socket member may be adjustably mounted on the windshield header without exposing the mounting means to view in the assembled position of the support assembly. In addition, the escutcheon member 81 may be resiliently held in engagement with the headlining 82 without locally depressing the headlining and without regard to whether the headlining be flexible, semi-rigid, or rigid. As can be seen, the spatial relationship between the headlining and the windshield header is unimportant with regard to the manner in which the assembly is mounted on the body, since the escutcheon member may be easily adjusted to a wide range of spatial relationships by merely threading the socket member into and out of the nut. Also, the manufacturing tolerances of the header and nut are not critical, since the socket member may be adjusted to allow for a wide range of tolerances.

Although the shoulder 72 of the socket member is shown in engagement with the lower edge of the nut when the escutcheon member resiliently engages the headlining, it is obvious that the shoulder 72 need not always engage the nut in order that the escutcheon member resiliently engage the headlining.

Referring now to Figure 4, another embodiment of this invention will be described and like numerals will be used for like parts. The embodiment shown in Figure 4 is substantially the same as that shown in Figure 3 except for the sunshade support arm and the manner in which this arm is mounted on the socket member 68'. The socket member 68' is provided with a downwardly tapering bore 102 which merges into a downwardly facing hemispherical seat 103. A spindle 104 of the sunshade support arm 105 includes a hemispherical ball 106 which is complementary to seat 103 and is adapted to fit within the seat in tight fitting engagement therewith but movable relative thereto. The upper end of spindle 104 is bifurcated at 107 and the legs of this bifurcated portion are bent laterally with respect to the spindle in order to provide a stop for a washer 108. A nylon or other antifriction washer 110 is provided with a convex upper surface 112 and a bore 114 which is a continuation of bore 102 and receives spindle 104. Bore 114 is surrounded by an annular groove 115 which receives an annular rib 116 of the socket member in order to position the washer on the socket member. A concave spring washer 118 fits against the upper convex surface of washer 110 and has a central opening of substantially the same diameter as spindle 104. A coil compression 120 extends between washers 108 and 118 in order to bias spindle 104 upwardly within bore 102 and hold the hemispherical ball 106 of the spindle in tight fitting engagement with the hemispherical seat 103 but allowing movement therebetween.

The spindle 104 also includes a lower splined end 122 which is received within a bore 124 of an arm 126. Bore 124 is of slightly smaller diameter than the outer diameter of the splined end 122 so that the splined end may be forced into the bore to provide a fixed connection between the spindle and arm 126. The arm also includes a bore 128 which is lateral to bore 124 and receives one end of a rod 130. The sunshade 132 is supported by rod 130 in the usual manner. Arm 126 is provided with a slot, such as slot 96, which opens to bore 128. A screw 133 joins the internally threaded bosses 134 of the arm on either side of the slot in order to clamp rod 130 to the arm.

This arrangement allows rotational and/or tilting movement of arm 105 relative to the socket member. During rotational movement of arm 105, spindle 104 rotates within bore 102 and ball 106 rotates relative to seat 103 while washers 108 and 118 and spring 120 remain stationary. When arm 105 is tilted relative to the socket member, spindle 104 may be shifted through an arc limited by the taper of the bore as ball 106 rotates relative to seat 103 and washers 108 and 118 and spring 120 move with the spindle with washer 118 sliding on surface 112 of washer 110.

Referring now to Figure 5 of the drawings, a further embodiment of my invention will be described and like numerals will again be used for like parts. This embodiment is substantially the same as that shown in Figure 4 except for the manner in which the escutcheon plate is supported on the socket member. The embodiment of Figure 5 is particularly adaptable for vehicle bodies wherein the headlining 140 fits flush with the lower channel-shaped member 32 of the windshield header. When the headlining fits flush with a rigid surface it is not necessary to resiliently support the escutcheon member on the socket member since there is no possibility of depressing the headlining around the socket member to locally change its contour plane. Thus, the escutcheon member 142 merely rests on the annular flange 74 of the socket member without any spring being interposed between the flange and the escutcheon member.

When the socket member 68' is threaded into nut 60, the escutcheon member is rigidly clamped between the socket member and the lower channel-shaped member 32 of the windshield header and holds the headlining 140 against member 32. It will also be noted that the escutcheon member includes a substantially upright rib 144 which is adapted to be received within a slot 146 extending radially from opening 59 in member 32, with opening 148 in the headlining being enlarged in the area of slot 146 to allow for the rib. The rib and slot provide a means of accurately locating the escutcheon member with respect to member 32 and the headlining 140.

Referring now to Figure 6 of the drawings, yet another embodiment of my invention will be described and like numerals will again be used for like parts. This embodiment of my invention is substantially the same as that shown in Figure 3 except for the manner of mounting the escutcheon member on the socket member with this manner being the same as that shown in Figure 5.

Other than this description, it is believed that no further description is necessary.

Referring now particularly to Figure 7 of the drawings, yet a further embodiment of my invention will be described. This embodiment of the invention is substantially the same as that shown in Figure 3 except for the provision of an improved sunshade support arm and a modification in the manner in which the tapered portion 86 of arm 88 is held within the bore 85 of the socket member.

In this embodiment of the invention, the bifurcated portion 90 of the spindle is smaller than that of Figure 3 such that the washer 92 will rest against the shoulder 150 between the bifurcated portion 90 and the tapered portion 86 of arm 88 when the legs of the bifurcated portion are bent laterally over the washer. Other than this difference the mounting of the tapered portion 86 of arm 88 on the socket member is the same as that previously described in conjunction with Figure 3.

The laterally extending portion 94 of the sunshade support arm 88 is provided with an annular bore 152 opening to one end thereof and joined to an outwardly tapering bore 154 which opens to the other end thereof to an annular groove 156. The rod 130 which supports the sunshade is fixed to an S-shaped elbow member 158 provided with a spindle 160 which is received within bores 152 and 154. A sleeve 162 having an outer tapered surface complementary to the tapered bore 154 fits between the tapered bore and spindle 160 to rotatably support the spindle on portion 88 of the support arm. A bolt 164 received within bore 152 is threaded into a threaded bore 166 opening to the end of spindle 160 with a washer 168 being located between the head of the bolt and the end of the spindle. A coil compression spring 170 extends between the head of the bolt and sleeve 162 in order to maintain the sleeve in tight fitting engagement with the tapered bore 154 and to bias the spindle inwardly within portion 88 of the support arm. Spindle 160 is also provided with an annular collar 172, which may be integral therewith or separate and secured thereto, provided with a toothed edge 174 comprised of a number of equally spaced blunt teeth. These blunt teeth are adapted to engage with the base wall of groove 156 under the action of spring 170 to maintain spindle 160 and elbow 158 in any rotated position relative to arm portion 88.

In this embodiment of the invention the sunshade support arm and elbow 158 may be rotated about a substantially vertical axis as defined by the axis of rotation of portion 86 of arm 88. In addition, elbow 158 may be rotated relative to portion 94 of arm 88 through a range of 360 degrees in any position of the arm 88 in order to increase the number of positions to which the sunshade may be moved.

Although specific embodiments of my invention have been shown and described, various changes and modifications may be made within the scope and spirit of the invention.

We claim:

1. In combination with a vehicle body having a body header provided with an aperture therein, a sunshade support assembly comprising, a nut member positioned within said aperture and secured to said body header adjacent thereto, a socket member threadedly received by said nut to secure said socket member thereto in adjustable telescopic relationship and having a bore therethrough, a sunshade support arm rotatably received within the bore of said socket member, means limiting movement of said arm inwardly of said bore, resilient means seating between said socket member and said arm for biasing said arm inwardly within said bore, and an escutcheon member supported by said socket member and adjustable with respect to said body header upon adjustment of said socket member relative to said nut member.

2. In combination with a vehicle body having a body header provided with an aperture therein, a sunshade support assembly comprising, a nut member positioned within said aperture and secured to said body header adjacent thereto, a generally upright socket member threadedly received by said nut to secure said socket member thereto in adjustable telescopic relationship and having an upwardly tapering bore therein, a complementary tapered sunshade support arm rotatably received within said bore, resilient means seating between said socket member and said arm for biasing said arm into frictional engagement with said bore, and an escutcheon member supported by said socket member and adjustable with respect to said body header upon adjustment of said socket member relative to said nut member.

3. In combination with a vehicle body having a body header provided with an aperture therein, a sunshade support assembly comprising a nut member positioned within said aperture and secured to said body header adjacent thereto, a generally upright socket member threadedly received by said nut to secure said socket member thereto in adjustable telescopic relationship and having a bore therethrough terminating in a downwardly facing ball seat, a support spindle received within said bore and including a ball member seating on said seat, resilient means seating between said socket member and said spindle for biasing said spindle inwardly within said bore to seat said ball member on said seat, and an escutcheon member supported by said socket member and adjustable with respect to said body header upon adjustment of said socket member relative to said nut member.

4. In combination with a vehicle body having a body header provided with an aperture therein, a sunshade support assembly comprising, a flanged nut member positioned within said aperture and having the flange thereof secured to said body header adjacent thereto, an apertured socket member threadedly received by said nut to secure said socket member thereto in adjustable telescopic relationship and having a flange spaced from said support, a sunshade support arm rotatably received within the aperture of said socket member, means limiting movement of said arm inwardly of said aperture, resilient means seating between said socket member and said arm for biasing said arm inwardly within said aperture, and an escutcheon member supported by the flange of said socket member and adjustable with respect to said body header upon adjustment of said socket member relative to said nut member.

5. In combination with a vehicle body having a body header provided with an aperture therein, a sunshade support assembly comprising, a nut member positioned within said aperture and secured to said body header adjacent thereto, an apertured socket member threadedly received by said nut to secure said socket member thereto in adjustable telescopic relationship and having a flange spaced from said support, a sunshade support arm rotatably received within the aperture of said socket member, means limiting movement of said arm inwardly of said aperture, resilient means seating between said socket member and said arm for biasing said arm inwardly within said aperture, an escutcheon member surrounding said socket member, and spring means seating on said flange and yieldably supporting said escutcheon member on said socket member.

6. In combination with a vehicle body having a body header provided with an aperture therein, a sunshade support assembly comprising, a flanged nut member positioned within said aperture and having the flange thereof secured to said body header adjacent thereto, a generally upright apertured socket member threadedly received by said nut to secure said socket member thereto in adjustable telescopic relationship and having an annular flange at the lower end thereof, a sunshade support arm rotatably received within said aperture, means limiting movement of said arm inwardly of said aperture, resilient means seating between said socket member and said arm for biasing said arm inwardly within said aperture, an apertured escutcheon member surrounding said socket member and having an annular flange located in upright opposed relationship to said flange of said socket member, and spring means seating on said flanges to resiliently support said escutcheon member on said socket member.

References Cited in the file of this patent

UNITED STATES PATENTS

| | | |
|---|---|---|
| 1,702,888 | Balch | Feb. 19, 1929 |
| 1,913,277 | Hoople | June 6, 1933 |
| 2,190,622 | Bahr | Feb. 13, 1940 |
| 2,284,502 | Westrope | May 26, 1942 |
| 2,357,974 | Roberts | Sept. 12, 1944 |
| 2,360,183 | Westrope | Oct. 10, 1944 |
| 2,394,276 | Venditty | Feb. 5, 1946 |
| 2,509,563 | Grashow | May 30, 1950 |
| 2,698,728 | Hedeen | Jan. 4, 1955 |
| 2,701,113 | Koonter | Feb. 1, 1955 |

FOREIGN PATENTS

| | | |
|---|---|---|
| 405,803 | Italy | Sept. 13, 1943 |